US010915787B2

(12) United States Patent
Kehl

(10) Patent No.: US 10,915,787 B2
(45) Date of Patent: Feb. 9, 2021

(54) SYSTEM AND METHOD FOR GENERATING TRAINING DATA FROM SYNTHETIC IMAGES

(71) Applicant: Toyota Research Institute, Inc., Los Altos, CA (US)

(72) Inventor: Wadim Kehl, San Francisco, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 147 days.

(21) Appl. No.: 15/929,063

(22) Filed: Nov. 15, 2018

(65) Prior Publication Data
US 2020/0160105 A1 May 21, 2020

(51) Int. Cl.
*G06T 1/00* (2006.01)
*G06K 9/62* (2006.01)
*G06T 7/00* (2017.01)

(52) U.S. Cl.
CPC ......... *G06K 9/6256* (2013.01); *G06K 9/6262* (2013.01)

(58) Field of Classification Search
CPC ...... G06K 9/00; G06K 9/6262; G06K 9/6256; G06K 9/6236; G06K 9/00805; G06K 9/00791; G06K 9/6255; G06K 9/6259; G06T 5/00
USPC ........................................................ 382/157
See application file for complete search history.

(56) References Cited

U.S. PATENT DOCUMENTS

2017/0061625 A1* 3/2017 Estrada ................ G06N 3/0454
2017/0351935 A1* 12/2017 Liu ....................... G06K 9/6256

OTHER PUBLICATIONS

Rad et al., "Feature Mapping for Learning Fast and Accurate 3D Pose Interference from Synthetic Images", undated CVPR 2018 submission, pp. 6663-6672.
Zakharov et al., "Keep it Unreal: Bridging the Realism Gap for 2.5D Recognition with Geometry Priors Only". 10.1109/3DV.2018. 00012. (2018) in 21 pages.
Tobin et al., "Domain Randomization for Transferring Deep Neural Networks from Simulation to the Real World" arXiv:1703.06907v1 [cs.RO] Mar. 20, 2017 in 8 pages.
Kehl et al, 'Making RGB-based 3d Detection and 6d Pose Estimation Great Again' 2017 pp. 1521-1529.

* cited by examiner

*Primary Examiner* — Ali Bayat
(74) *Attorney, Agent, or Firm* — Christopher G. Darrow; Darrow Mustafa PC

(57) ABSTRACT

In one embodiment, example systems and methods relate to a manner of generating training data for a classifier or a regression function using labeled synthetic images and a mapping that accounts for the differences between synthetic images and real images. The mapping may be a neural network that was trained using image pairs that each include an image of an object and a synthetic image that is generated from the image of the object by overlaying a rendering of the object into the image. The mapping may recognize the differences between features of the object in the real image and features of the rendering of the object in the synthetic image such as color, contrast, sensor noise, etc. Later, a set of labeled synthetic images is received, and the mapping is used to generate training data from the labeled synthetic images.

20 Claims, 7 Drawing Sheets

SYSTEM AND METHOD FOR GENERATING TRAINING DATA FROM SYNTHETIC IMAGES

TECHNICAL FIELD

The subject matter described herein relates, in general, to systems and methods for electronically generating training data from synthetic images, and, in particular, to adjusting labeled synthetic images using a sensor specific mapping learned using sensor generated images overlaid with rendered objects

BACKGROUND

Machine learning classifiers are used to recognize and classify a variety of objects in images. For example, classifiers are used to recognize faces, read text, identify food, identify obstacles on a road, etc.

Classifiers are trained to recognize particular objects using training data. Typically, the training data include images that include objects that have been labeled. For example, a classifier programmed to recognize types of food may be presented with images of food that have labels that identify the type or name of the food that is depicted in each image.

As may be appreciated, acquiring the breadth and quantity of training data needed to train a classifier may represent a significant hurdle. First, a large number of images may be manually captured and generated. Second, the generated images may then be manually labeled. As a result, generating training data can be a costly and time consuming process. Moreover, because the images are manually labeled, errors can be introduced into the classifier due to image mislabeling.

One solution to the problem of insufficient training data is the use of synthetic images. A synthetic image is an image generated by a computer. Because the computer generated the image, and knows the objects that it placed in the image, the computer can easily label the synthetic image. Accordingly, a large number of labeled synthetic images can be quickly and efficiently generated.

However, there are drawbacks associated with classifiers trained using synthetic images. While synthetic images can appear photorealistic, there are often subtle differences between synthetic images and real images (i.e., photographs). These differences may be due to a variety of factors such as characteristics of the sensors used to capture the real images. While such differences may not be recognizable to a human observer, they are recognizable to the classifier. As a result, a classifier trained using synthetic images may excel at recognizing objects in synthetic images, but struggle to recognize objects in real images or photographs.

SUMMARY

In one embodiment, example systems and methods relate to a manner of generating training data for a classifier or a regression function using labeled synthetic images and a mapping that accounts for the differences between synthetic images and real images. The mapping may be produced by a neural network that was trained using image pairs that each include an image of an object and a synthetic image that is generated from the image of the object by overlaying a rendering of the object into the image. The mapping may recognize the differences between features of the object in the real image and features of the rendering of the object in the synthetic image such as color, contrast, sensor noise, etc. Later, a set of labeled synthetic images is received, and the mapping is used to generate training data from the labeled synthetic images. For example, the mapping may be used to adjust features of the synthetic images to more resemble features of the non-synthetic images.

In one embodiment, a system for generating a set of training data is provided. The system includes one or more processors and a memory communicably coupled to the one or more processors. The memory can store a mapping module including instructions that when executed by the one or more processors cause the one or more processors to: receive a set of images, wherein each image in the set of images depicts an object; for each image in the set of images, generate a synthetic image from the image, wherein the synthetic image includes a rendering of the object depicted in the corresponding image; and based at least in part on the images in the set of images and the corresponding generated synthetic images, generate a mapping function. The memory can further store a training module including instructions that when executed by the one or more processors cause the one or more processors to: receive a set of synthetic images; and generate training data from the set of synthetic images using the mapping.

In one embodiment, a method for generating training data is provided. The method includes: receiving a set of images, wherein each image in the set of images depicts an object; for each image in the set of images, generating a synthetic image from the image, wherein the synthetic image includes a rendering of the object depicted in the image; based at least in part on the images in the set of images and the corresponding generated synthetic images, generating a mapping function; receiving a set of synthetic images; and generating training data from the set of synthetic images using the mapping function.

In one embodiment, a non-transitory computer-readable medium for generating training data is provided. The non-transitory computer-readable medium includes instructions that when executed by one or more processors cause the one or more processors to: receive a set of images, wherein each original image in the set of images depicts an object; for each image in the set of images, generate a synthetic image from the image by: generating a rendering of the object depicted in the image; and overlaying the rendering of the object onto the depiction of the object in the image to generate the synthetic image; and based at least in part on the images in the set of original images and the corresponding generated synthetic images, generate a mapping function; receive a set of synthetic images; generate training data from the set of synthetic images using the mapping function; and train a classifier using the generated training data.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Disclosed herein are systems, methods, and other embodiments associated with learning a mapping that can adjust one or more features of synthetic images to more closely resemble features of "real" images captured by a particular sensor. Using labeled synthetic images to train classifiers or regression functions is desirable because of the high costs associated with generating and labeling real images. However, as mentioned previously, using labeled synthetic images to train classifiers, while cheaper, often results in classifiers that perform poorly when used to classify read images.

Therefore, in one embodiment, a training system receives a set of images captured by a particular sensor, such as a camera used by an autonomous or semi-autonomous vehicle. Each image depicts a particular type of object such as a vehicle. The training system generates synthetic images from each image by replacing the object depicted in each image with a rendering of the object. The training system then uses the original images and the synthetic images to learn a mapping of synthetic image features to features of images generated by the sensor. The mapping may be based on differences between the synthetic images and images generated by the sensor. These differences may be due to characteristics of the sensor.

The training system later uses the learned mapping to generate training data that include synthetic images that appear more like images generated by the sensor. The training system passes the synthetic images though the mapping such that one or more features of the labeled synthetic images are adjusted while the labeling of the synthetic images is persevered. The training system then trains a classifier or regression function using the labeled synthetic images. The trained classifier or regression function may then be used on images generated by the sensor of the autonomous or semi-autonomous vehicle.

The training system described herein provides many advantages over current methods for generating training data. In particular, the training system allows for classifiers and regression functions for a sensor to be trained quickly and efficiently using synthetic images, without the poor performance associated with training using synthetic images.

Figure 1:
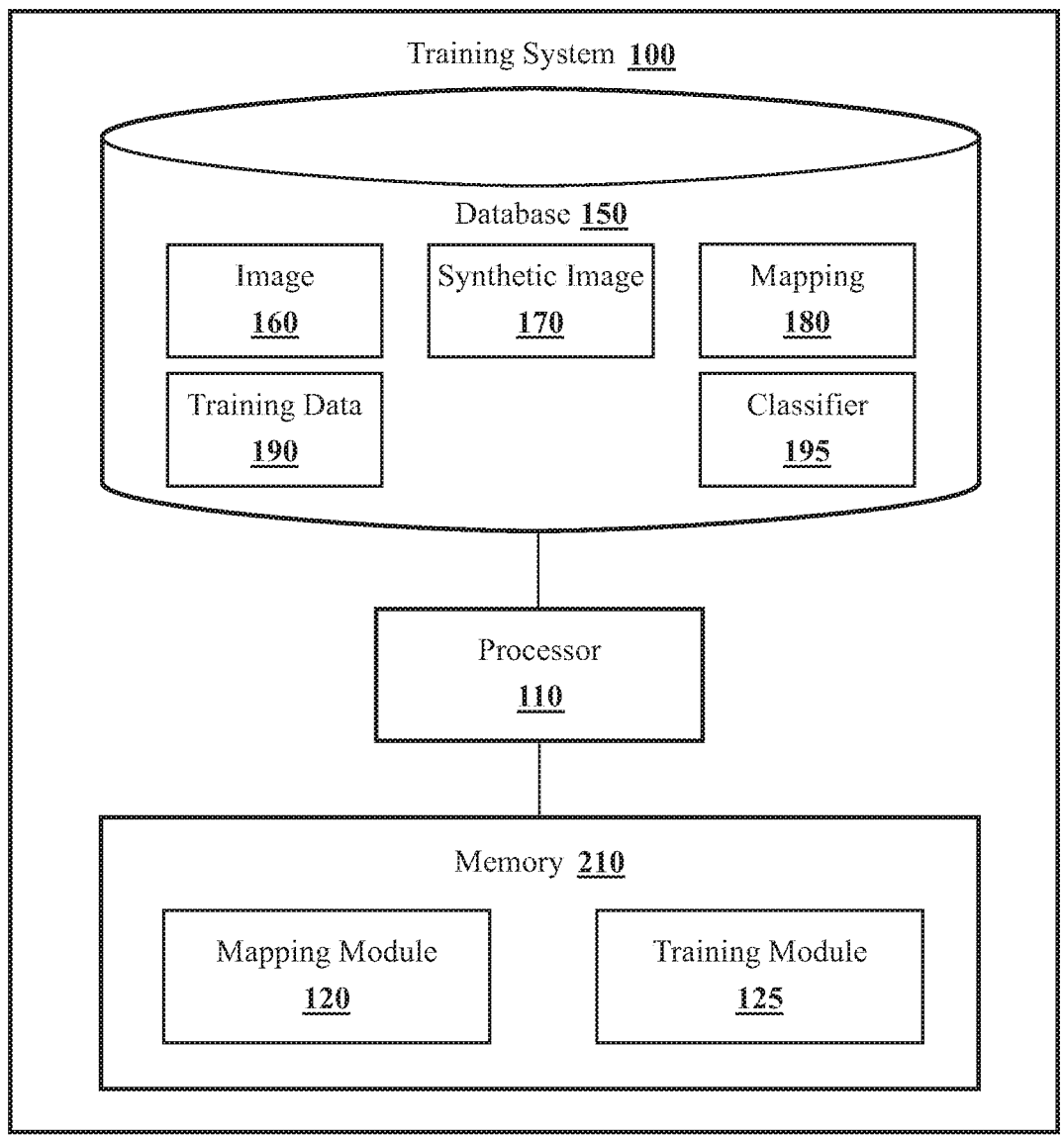
FIG. 1 illustrates one embodiment of a training system that is associated with generating training data including labeled synthetic images.

Referring to FIG. 1, one embodiment of a training system 100 that is implemented to perform methods and other functions as disclosed herein relating to generating training data is illustrated. It should be appreciated, that while the training system 100 is illustrated as being a single contained system, in various embodiments, the training system 100 is a distributed system that is comprised of components that can be provided as a centralized server, a cloud-based service, and so on.

As an additional note, while the training system 100 is generally applicable to many different contexts within which machine learning algorithms may be implemented, in one or more embodiments, the training system 100 is implemented to at least support functions of an advanced driving assistance system (ADAS) and/or an autonomous driving module that provides autonomous driving (i.e., self-driving) functionality to a vehicle. For example, the autonomous driving module, in one embodiment, is comprised of a plurality of sub-modules that each perform a respective task in relation to autonomously operating the vehicle. That is, the autonomous driving module includes sub-modules that, in combination, determine travel path(s), current autonomous driving maneuvers for the vehicle 700, future autonomous driving maneuvers and/or modifications to current autonomous driving maneuvers. In general, to effectively operate the individual task-specific modules, they need to be trained using labeled training data from different situations that the vehicle may encounter.

However, as previously noted, acquiring this training data can represent a significant difficulty. Therefore, the training system 100 can be employed to generate training data for training various sub-modules by adjusting features of labeled synthetic images using a learned mapping of synthetic image features to real or captured image features. The mapping may be specific to a sensor used by the vehicle 700. Accordingly, the training system 100, in one embodiment, provides training data (e.g., labeled synthetic images) to one or more of the sub-modules or components thereof as a manner of more efficiently generating training data.

With further reference to FIG. 1, the training system 100 is shown as including a processor 110. Accordingly, the processor 110 may represent a distributed processing resource, an individual local processor (e.g., a CPU, GPU, or application specific processor), or the training system 100 may access the processor 110 through a data bus or another communication path. In one embodiment, the training system 100 includes a memory 210 that stores a mapping module 120 and a training module 125. The memory 210 is a random-access memory (RAM), a read-only memory (ROM), a hard-disk drive, a flash memory, a processor cache, or other suitable memory for storing the modules 120 and 125. The modules 120 and 125 are, for example, computer-readable instructions that when executed by the processor 110 cause the processor 110 to perform the various functions disclosed herein.

Moreover, as previously noted, in various embodiments, one or more aspects of the training system 100 are implemented as cloud-based services, and so on. Thus, one or more components of the training system 100 may be located remotely from other components and may be implemented in a distributed manner. As an additional matter, the training system 100 includes the database 150 as a means of storing various data elements. The database 150 is, in one embodiment, an electronic data structure stored in the memory 210 or a separate electronic data store that is configured with routines that can be executed by the processor 110 for analyzing stored data, providing stored data, organizing stored data, and so on. Thus, in one embodiment, the database 150 stores data used by the modules 120 and 125 in executing various functions. In the embodiment depicted in FIG. 1, the database 150 includes image(s) 160, synthetic image(s) 170, a mapping 180, training data 190, and a classifier 195, and/or other information that is used by the modules 120 and/or 125.

Continuing with the mapping module 120, in one embodiment, the mapping module 120 receives a set of images 160. Each image 160 may be a "real" image and may include photographs or other image types. Each image 160 may be associated with a sensor, such as a sensor used by a camera to produce or generate the image 160. Depending on the embodiment, each image 160 may be associated with the same sensor. The sensor may be a sensor used by autonomous or semi-autonomous vehicles. An example vehicle is the vehicle 700 illustrated in FIG. 7.

Each image 160 may depict at least one object. The object may include a variety of object types such as text, things, faces, etc. Any type of object may be depicted in the image 160. Depending on the embodiment, each image 160 in the set of images 160 may depict the same type of object, or may depict different types of objects. For example, each image 160 in the set of images 160 may depict a street sign or a vehicle.

The mapping module 120 may generate a synthetic image 170 for each image 160 in the set of images 160. Thus, each image 160 may have a corresponding synthetic image 170. In one embodiment, the mapping module 120 may generate a synthetic image 170 for an image 160 by first generating a rendering of the object depicted in the image 160. The rendering may be generated from a computer aided design ("CAD") model and may be a synthetic representation of the object depicted in the image 160. The object may be rendered by the mapping module 120 such that the object appears similar to the corresponding object depicted in the image 160. For example, the rendered object may have approximately the same color, resolution, orientation, texture, and size as the corresponding object depicted in the image 160. Any method for rendering objects may be used.

The mapping module 120 may then generate the synthetic image 170 for a particular image 160 by overlaying the rendering of the object onto the image 160. The image 160 with the overlaid rendering of the object may be saved by the mapping module 120 as the corresponding synthetic image 170. Depending on the embodiment, the mapping module 120 may overlay the rendering of the object in the image 160 so that the rendered object completely obscures the object depicted in the image 160. Any method or technique for overlaying renderings of objects onto images may be used.

The mapping module 120 may use images 160, and corresponding synthetic images 170, to generate a mapping 180. The mapping 180 may be produced by a mapping function that maps features of synthetic images 170 to features of images 160 captured by a particular sensor. In one implementation, the mapping 180 may be produced by a neural network, and the mapping module 120 may train the neural network to produce the mapping 180 by providing the neural network pairs of images. Each image pair may include an image 160 captured by the sensor and a corresponding synthetic image 170 generated by the mapping module 120 from the image 160. The mapping 180 may consider a variety of features of the image 160 and the synthetic image 170 to identify differences between the image 160 and the corresponding synthetic image 170 of the pair. The differences between the image 160 and the synthetic image 170 may include pixel-level differences between the rendering of the object in the synthetic image 170 and the object depicted in the image 160, differences in artifact patterns between the image 160 and the synthetic image 170, general sensor noise, and differences in color distributions between the image 160 and the synthetic image 170. Other differences may be considered by the mapping module 120 when generating the mapping 180.

In some embodiments, the mapping module 120 may generate a mapping 180 for different types of object. For example, the mapping module 120 may generate a mapping 180 that is specific to a car, or type of automobile, or the mapping module 120 may generate a mapping 180 that is for faces. In such embodiments, the mapping module 120 may only use images 160 that include the particular type of object when creating or training the corresponding mapping 180.

In addition, in some embodiments, the mapping module 120 may generate a mapping 180 for different types of sensors. For example, the mapping module 120 may generate a mapping 180 that is specific to a type of sensor used by autonomous or semi-autonomous vehicles, or may generate a mapping 180 that is specific to a type of sensor used in security cameras for performing facial recognition. Other types of sensors may be supported.

As may be appreciated, when the mapping module 120 generates a mapping 180 for a specific type of sensor, the mapping module 120 may use only images 160 that were generated by the specific type of sensor. For example, if the mapping module 120 is generating a mapping 180 for use by a sensor used by autonomous and semi-autonomous vehicles, the mapping module 120 may only use images 160 that were generated or captured by the particular sensor.

Continuing with the training module 125, in one embodiment, the training module 125 generally includes instructions that function to control the processor 110 to receive a set of synthetic images 170. The training module 125 electronically receives the synthetic images 170 from a simulator or other electronic source that generates the synthetic images 170. In one embodiment, such sources generate the synthetic image 170 according to the particular object that is desired. For example, the training module 125 may request a set of synthetic images 170 that depict vehicles, road obstacles, faces, etc.

Moreover, in further aspects, the training module 125 may itself generate the synthetic images 170 using an integrated simulator. For example, the training module 125 may accept text describing a scene and/or objects from which the training module 125 generates the synthetic images 170 or at least identifies the synthetic images 170 from a stored set of computer-generated images.

The synthetic images 170 may be labeled. In particular, each synthetic image 170 may be labeled to identify the object or objects that are depicted in the synthetic image 170. In one embodiment, some or all of the pixels of a synthetic image 170 may each be labeled to identify any objects that the pixel is part of in the synthetic image 170.

The training module 125 may further generate training data 190 from the synthetic images 170 of the set of synthetic images 170. In one embodiment, the training module 125 may generate the training data 190 from the set of synthetic images 170 by, for each synthetic image 170 in the set, applying the mapping 180 to the synthetic image 170. Applying the mapping 180 to the synthetic image 170 may adjust one or more features of the synthetic image 170 to be closer to the features of the images 160, while preserving the labeling associated with the synthetic image 170. Depending on the embodiment, the process of applying the mapping 180 to the synthetic image 170 may mimic the image formation and compression process of the particular sensor associated with the mapping 180.

The training module 125 may use the synthetic images 170 of the training data 190 to train one or more classifiers

195. A classifier 195 may be a function or program that is trained to identify objects, or types of objects, in an image 160. The training module 125 may train the classifier 195 using the labeled synthetic images 170 of the training data 190 as if the synthetic images 170 were real images 160 captured by the particular sensor. Note that the synthetic images 170 of the training data 190 are not limited to training classifiers 195. For example, the training module 125 may use the training data 190 to train, or provide input to, a regression function. Other types of functions or processes may use the training data 190.

As may be appreciated, the training system 100 described herein provides many advantages over current systems and methods for generating training data 190. In particular, by generating a mapping 180 that accounts for differences between images 160 and synthetic images 170, applying the mapping 180 to labeled synthetic images 170, and training one or more classifiers 195 (or other functions) using the labeled synthetic images 170, the costs of training classifiers 195 due to labeling and generating images 160 are greatly reduced.

Figure 2:
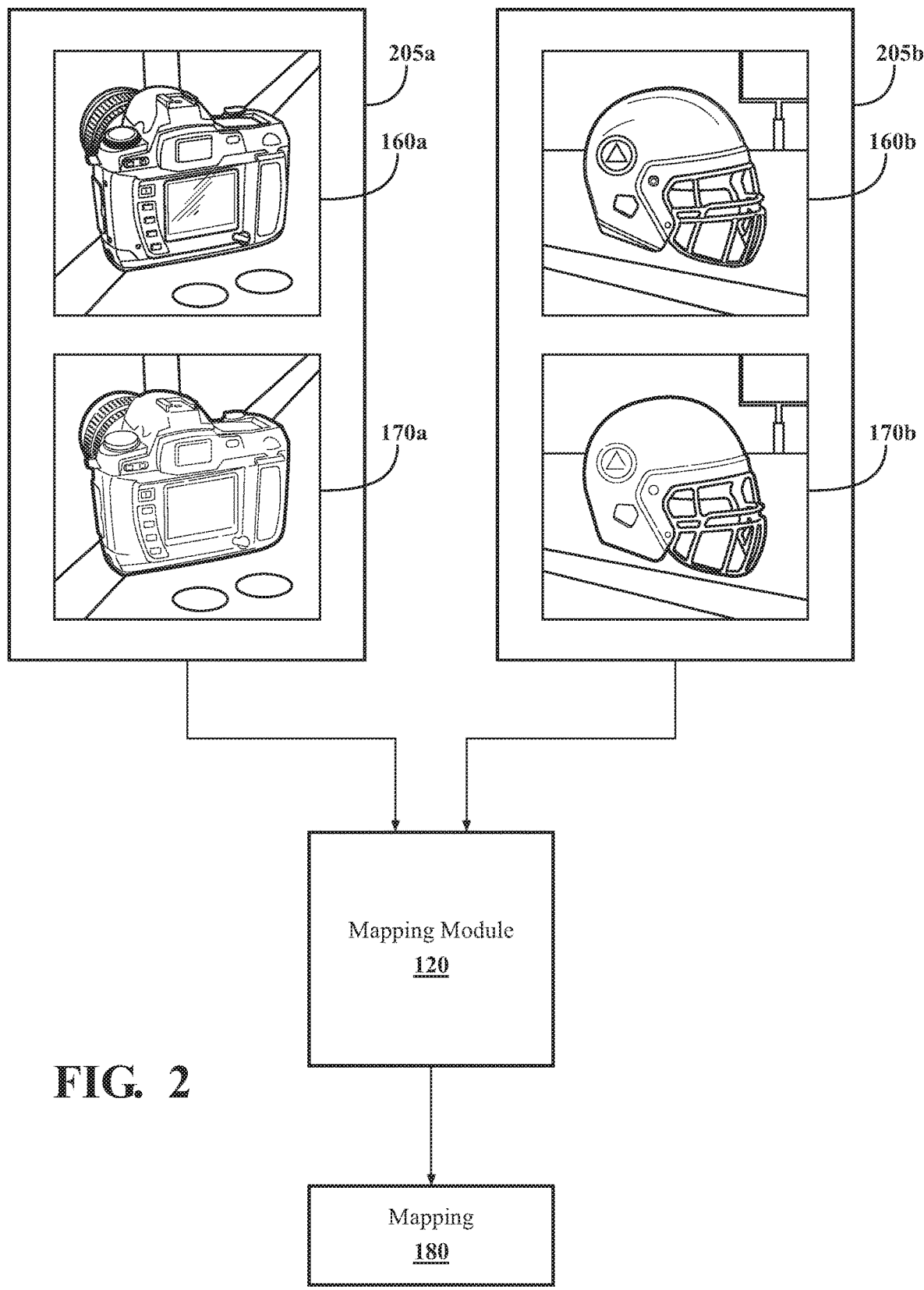
FIG. 2 illustrates one example of a mapping module as embodied herein.

With reference to FIG. 2, a further example of the mapping module 120 is illustrated. As described above, the mapping module 120 may receive pairs of images with each pair comprising an image 160 depicting an object and a synthetic image 170 including a rendering of the object depicted in the image 160. The mapping module 120 may then use the pairs to generate the mapping 180.

For example, FIG. 2 shows a pair 205*a* and a pair 205*b*. The pair 205*a* includes an image 160*a* of a camera, and a synthetic image 170*a* that includes a rendering of the same camera depicted in the image 160*a*. The mapping module 120 may have generated the synthetic image 170*a* by rendering the camera depicted in the image 160*a*, and overlaying the rendered camera over the camera depicted in the image 160*a*.

Similarly, the pair 205*b* includes an image 160*b* of a helmet, and a synthetic image 170*b* that includes a rendering of the same helmet depicted in the image 160*b*. The mapping module 120 may have generated the synthetic image 170*b* by rendering the helmet depicted in the image 160*a*, and overlaying the rendered helmet over the helmet depicted in the image 160*b*. Note that in both of the pairs 205*a* and 205*b*, the backgrounds of the corresponding images 160*a* and 160*b* and synthetic images 170*a* and 170*b* are the same. Each of the images 160*a* and 160*b* may have been captured or generated by the same sensor (e.g., camera).

Figure 3:
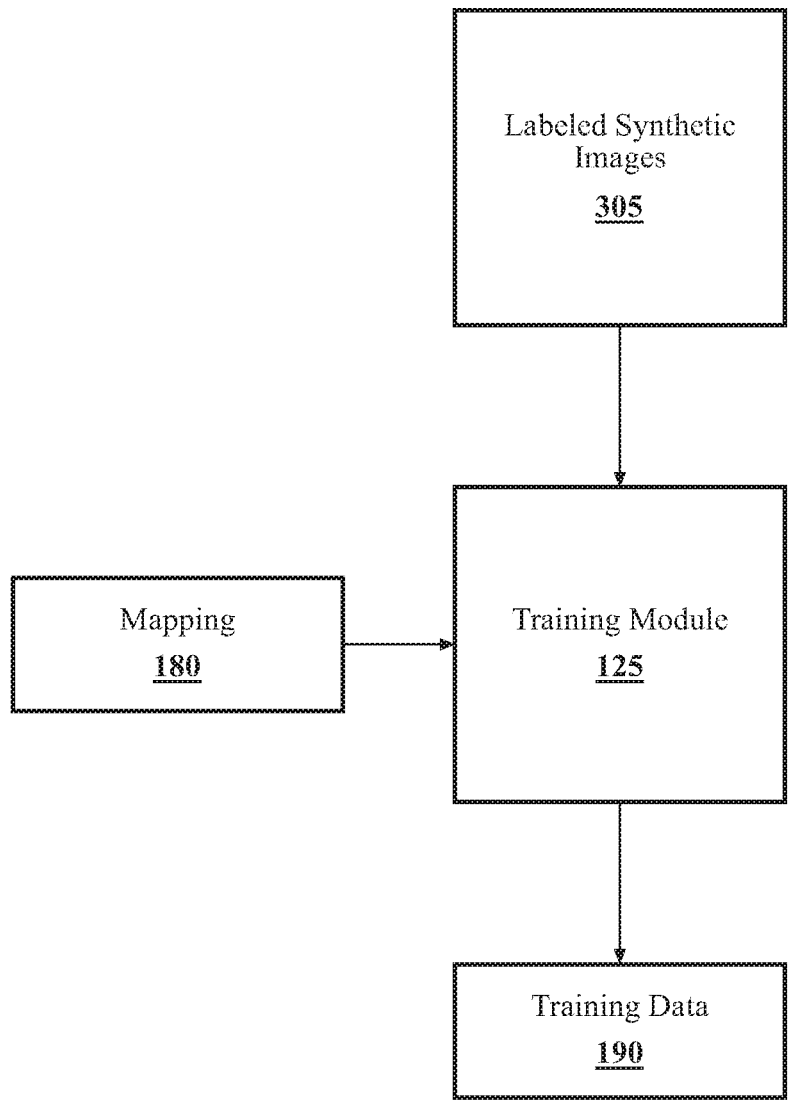
FIG. 3 illustrates one example of a training module as embodied herein.

With reference to FIG. 3, a further example of the training module 125 is illustrated. As shown, the training module 125 receives (or generates) labeled synthetic images 305. Depending on the embodiment, each of the labeled synthetic images 305 may include or depict the same object or types of objects.

The training module 125 may retrieve the mapping 180, and may use the mapping 180 and the labeled synthetic images 305 to generate the training data 190. In some embodiments, the mapping 180 may be a mapping function that maps features of synthetic images 170 to features of original or "real" images 160. The mapping 180 may be produced by a neural network. The training data 190 may include the labeled synthetic images 305 after having been passed through the mapping 180. The training data 190 may then be used to train one or more classifiers 195 and/or regression functions.

Figure 4:
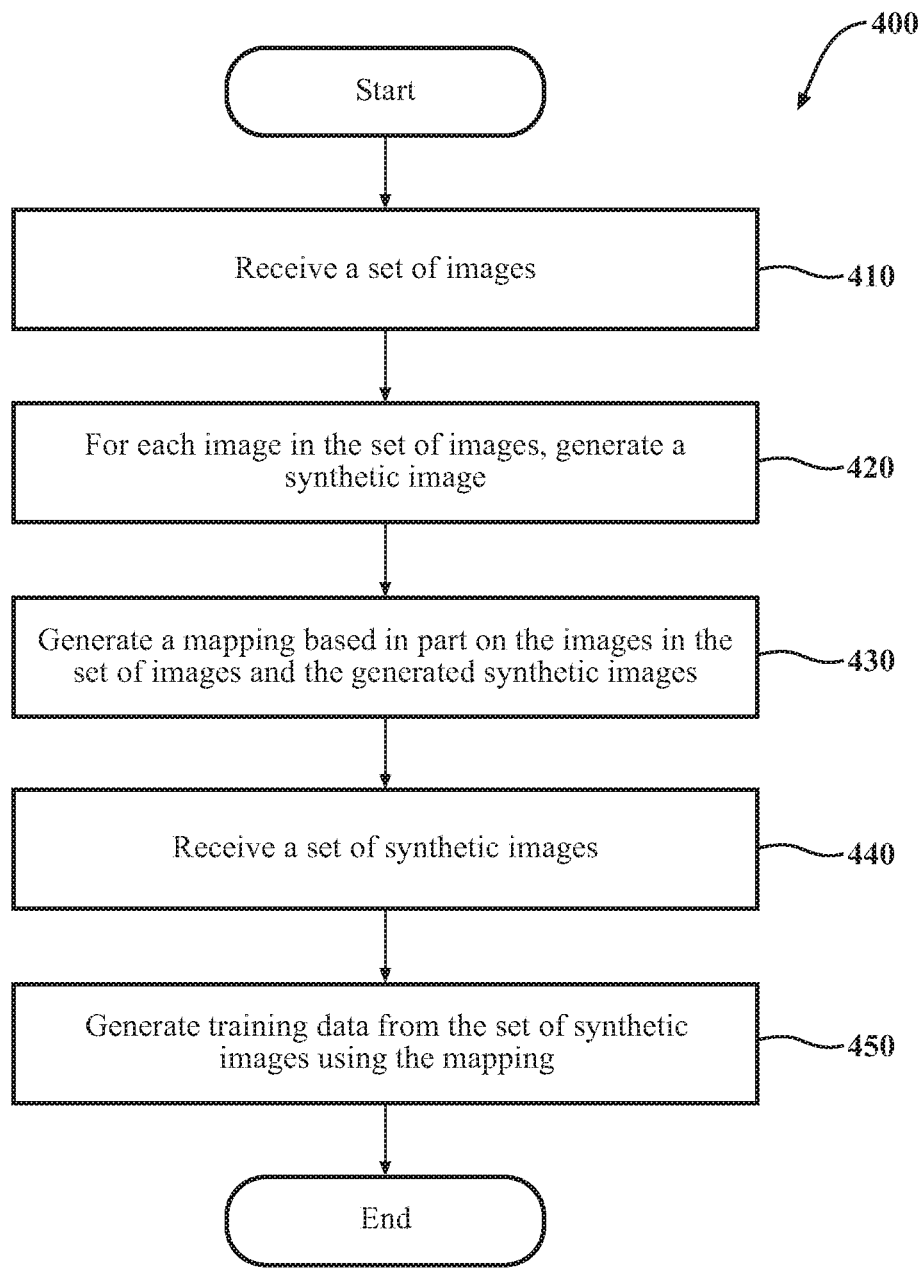
FIG. 4 illustrates one embodiment of a method associated with generating training data including labeled synthetic data.

Additional aspects of generating training data 190 using a mapping 180 and labeled synthetic images 170 will be discussed in relation to FIG. 4. FIG. 4 illustrates a flowchart of a method 400 that is associated with implementing a module to generate training data 190. Method 400 will be discussed from the perspective of the training system 100 of FIG. 1. While method 400 is discussed in combination with the training system 100, it should be understood that the method 400 is not limited to being implemented within the training system 100 but is instead one example of a system that may implement the method 400.

At 410, the mapping module 120 receives a set of images 160. The images 160 may be photographs (or frames of a video) and each image 160 may depict an object. In some embodiments, each image 160 may depict the same object or type of object. For example, each image 160 may depict vehicles, road hazards, lane markings, or street signs. Other types of objects may be depicted in the images 160.

In addition, each image 160 in the set of images 160 may have been generated or captured by the same type of sensor. The sensor may be a sensor typically used in cameras or video capture devices. For example, each of the images 160 may have been captured by a type of sensor used by autonomous or semi-autonomous vehicles. In another example, each of the images 160 may have been captured by a sensor used by a particular model of smartphone. Other types of sensors may be supported. The type of sensor used to generate an image 160 may be indicated in metadata associated with the image 160, for example.

At 420, the mapping module 120, for each image in the set of images 160, generates a synthetic image 170. In one embodiment, the mapping module 120 may generate a synthetic image 170 for an image 160 by generating a rendering of the object depicted in the image 160. The mapping module 120 may generate the rendering of the object using a computer model (e.g., CAD model) of the object. After generating the rendering of the object, the mapping module 120 may generate the synthetic image 170 by overlaying the rendering of the object onto the image 160. The rendering of the object may be overlayed on the image 160 such that it completely covers or obscures the actual object depicted in the image 160. The mapping module 120 may store the image 160 with the overlayed rendering as the synthetic image 170.

At 430, the mapping module 120 generates a mapping 180 based in part on the images 160 in the set of images 160 and the generated synthetic images 170. In some embodiments, the mapping 180 may be produced by a neural network that maps features of the synthetic images 170 to features of the images 160. The mapping module 120 may generate the mapping 180 using image pairs that include an image 160 from the set of images 160, and the corresponding synthetic image 170 generated from the image 160. Given enough image pairs, the mapping 180 learns the differences between the images 160 and the corresponding synthetic images 170. These differences may be due to how the sensor captures and/or generates images 160 and may include mosaicing, aberrations, biased noise, and JPEG artifacting, for example.

At 440, the training module 125 receives a set of synthetic images 170. Alternatively, the training module 125 may generate the synthetic images 170 in the set of synthetic images 170. The synthetic images 170 at 440 may be different from the synthetic images 170 used to generate the mapping 180 at 430.

The synthetic images 170 may be labeled synthetic images 170. The labels associated with a synthetic image 170 may identify the object, or objects, depicted in the synthetic image 170. The labels associated with a synthetic image 170 may have been automatically generated when the synthetic image 170 was generated. Depending on the implementation, each of the synthetic images 170 may depict the same object, or type of object. For example, each synthetic image 170 may depict a vehicle.

At 450, the training module 125 generates training data 190 from the set of synthetic images 170 using the mapping 180. The training module 125 may generate the training data 190 by adjusting or modifying the features of the synthetic images 170 using the mapping 180. As described above the mapping 180 may be produced by a neural network that maps features of synthetic images 170 to features of "real" images 160 produced or captured by the particular sensor. The training data 190 may include the synthetic images 170 of the set of synthetic images 170 after having been processed by the mapping 180. The processed synthetic images 170 in the training data 190 may include the labels associated with the synthetic images 170 from the set of set of synthetic images 170.

Figure 5:
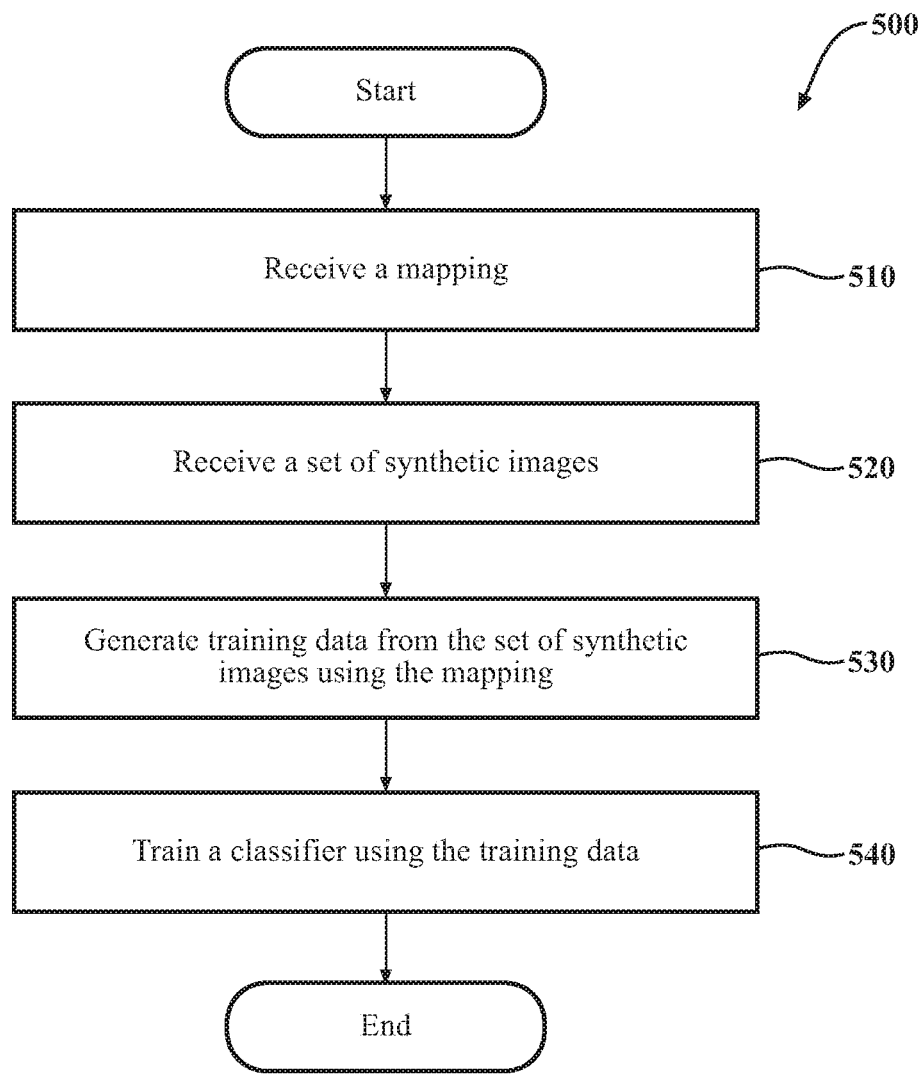
FIG. 5 illustrates one embodiment of a method associated with training a classifier using training data.

FIG. 5 illustrates a flowchart of a method 500 that is associated with training a classifier using synthetic images 170 such as those produced by the training system 100. Method 500 will be discussed from the perspective of the training system 100 of FIG. 1. However, it should be understood that the method 500 is not limited to being implemented within the training system 100, but is instead one example of a system that may implement the method 500.

At 510, the training module 125 receives a mapping 180. The mapping 180 may be received by the training module 125 from the mapping module 120. As described previously, the mapping 180 may be specific to a particular sensor and/or type of object and may be a mapping of features of synthetic images 170 to features of images 160 captured by the sensor. In one embodiment the training module 125 may request the mapping 180 corresponding to the sensor associated with the classifier 195 and/or regression function.

At 520, the training module 125 receives a set of synthetic images 170. The synthetic images 170 may be labeled synthetic images 170. The synthetic images 170 may each depict an object that the classifier 195 may be trained to recognize, or that may be of interest for training the regression function. The objects depicted in each synthetic image 170 may have been specified or requested by the training module 125, for example. Any method or technique for generating synthetic images 170 may be used.

At 530, the training module 125 generates training data 190 from the set of synthetic images 170 using the mapping 180. The training module 125 may generate the training data 190 by adjusting or modifying the features of the synthetic images 170 using the mapping 180. The training data 190 may include the synthetic images 170 of the set of synthetic images 170 after having been processed by the mapping 180. The processed synthetic images 170 in the training data 190 may include the labels associated with the synthetic images 170 from the received set of synthetic images 170.

At 540, the training module 125 trains a classifier 195 using the training data 190. The training module 125 may train the classifier 195 using the labeled synthetic images 170 of the training data 190. The classifier 195 may be a classifier 195 trained to identify the particular objects depicted in images 160 generated by the sensor associated with the mapping 180. Alternatively or additionally, the training module 125 may use the training data 190 to train a regression function.

For example, the classifier 195 may be trained to identify vehicles in images 160 generated by the camera 726 of the vehicle 700. The output of the classifier 195 may be provided as input to one or more autonomous driving modules 760 of the vehicle 700.

Figure 6:
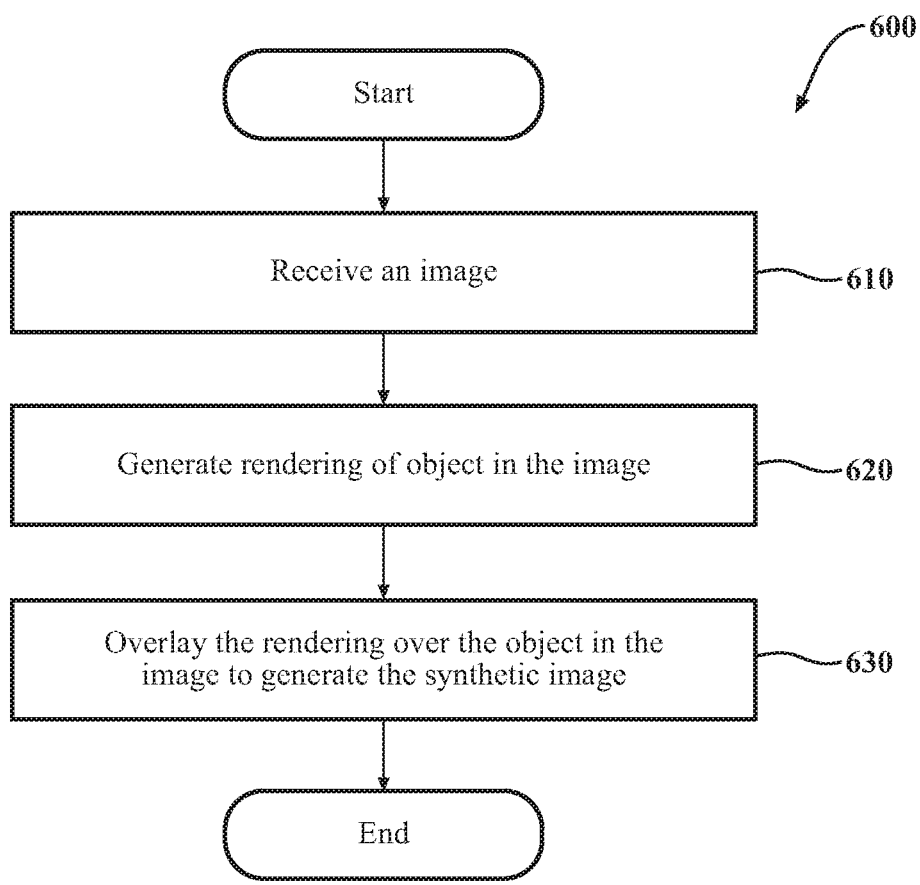
FIG. 6 illustrates one embodiment of a method associated with generating a synthetic image from an image and a rendering of an object depicted in the image.

FIG. 6 illustrates a flowchart of a method 600 that is associated with generating a synthetic image 170 from an image 160 such as those used by the training system 100 to generate a mapping 180. Method 600 will be discussed from the perspective of the training system 100 of FIG. 1. However, it should be understood that the method 600 is not limited to being implemented within the training system 100, but is instead one example of a system that may implement the method 600.

At 610, the training module 125 receives an image 160. The image 160 may be a photograph captured or generated by a sensor such as the camera 726 of the vehicle 700. The image 160 may depict an object such as a vehicle, for example. The image 160 may be one of a plurality of images 160 that are to be used to generate a mapping 180.

At 620, the training module 125 generates a rendering of an object depicted in the image 160. The training module 125 may generate the rendering by retrieving a digital representation of the object depicted in the image 160 (e.g., a CAD model) and may generate the rendering based on the retrieved digital representation. The digital representation may be retrieved from the database 150 and/or the memory 210, or may be requested from an external source or service by the training module 125. In one embodiment, the training module 125 may determine the type of object depicted in the image 160 based on metadata or other information associated with the image 160 that identifies the type of object (or objects) that is depicted in the image 160.

At 630, the training module 125 overlays the rendering over the object in the image 160 to generate the synthetic image 170. The training module 125 may overlay the rendering such that it completely obscures the object depicted in the image 160. The original image 160 and the generated synthetic image 170 may be used by the training module 125 as input to the mapping 180.

Figure 7:
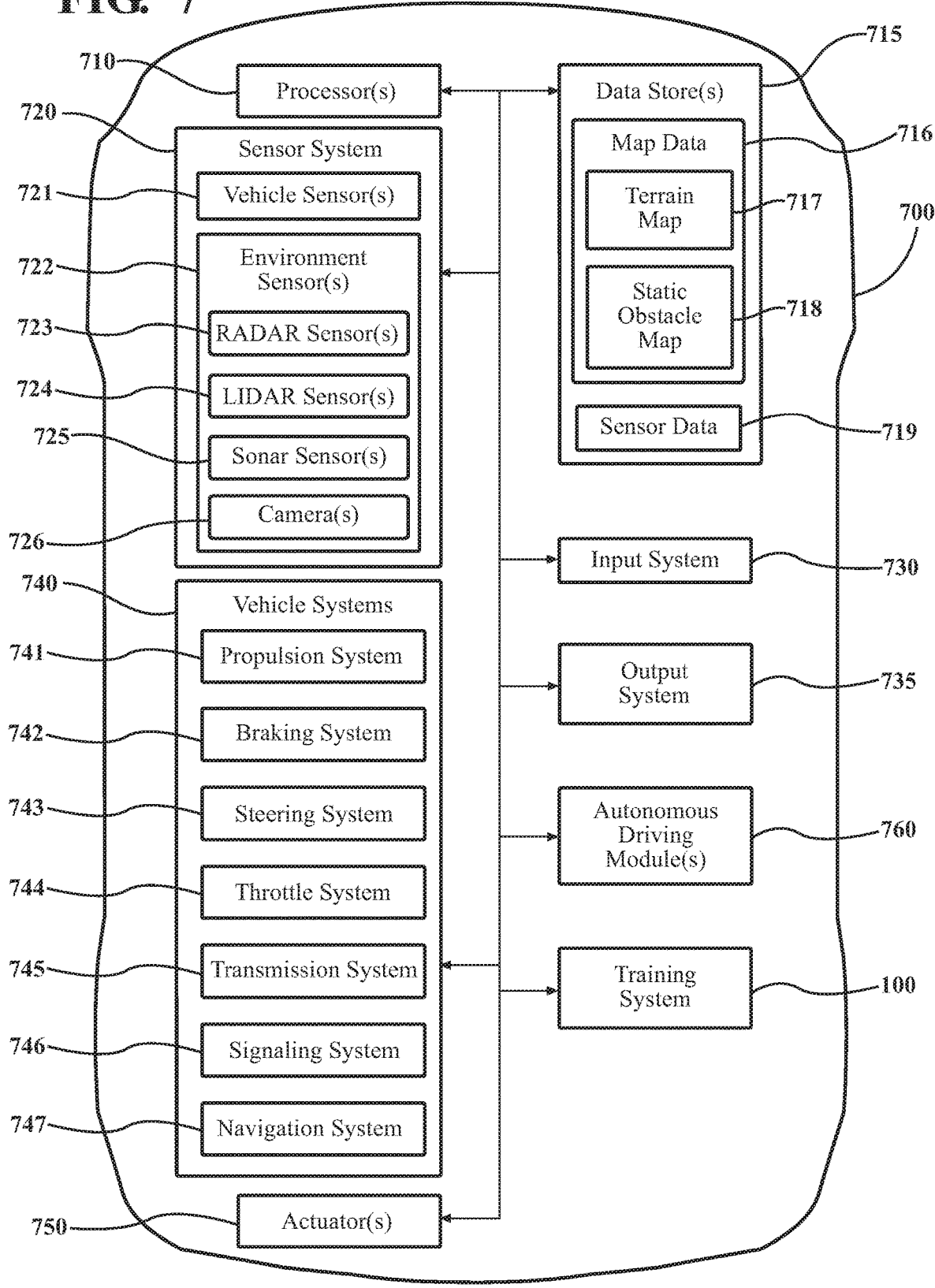
FIG. 7 illustrates one embodiment of a vehicle within which systems and methods disclosed herein may be implemented.

As an additional example of an implementation of at least a portion of the training system 100, an example vehicle 700 will now be discussed in relation to FIG. 7. FIG. 7 represents an example environment within which the system and methods disclosed herein may operate. In some instances, the vehicle 700 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 700 can be a conventional vehicle that is configured to operate in only a manual mode.

In one or more embodiments, the vehicle 700 is an autonomous vehicle. As used herein, "autonomous vehicle" refers to a vehicle that operates in an autonomous mode to self-drive without control inputs from a human driver. "Autonomous mode" refers to navigating and/or maneuvering the vehicle 700 along a travel route using one or more computing systems to control the vehicle 700 with minimal or no input from a human driver. In one or more embodiments, the vehicle 700 is highly automated or completely automated. In one embodiment, the vehicle 700 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 700 along a travel route.

The vehicle 700 can include one or more processors 710. In one or more arrangements, the processor(s) 710 can be a main processor of the vehicle 700. For instance, the processor(s) 710 can be an electronic control unit (ECU). The vehicle 700 can include one or more data stores 615 for storing one or more types of data. The data stores 715 can include volatile and/or non-volatile memory. Examples of suitable data stores 715 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 15 can be a component of the processor(s) 710, or the data store 715 can be operatively connected to the processor(s) 710 for use thereby. The term "operatively connected," as used throughout this description, can include direct or indirect connections, including connections without direct physical contact.

In one or more arrangements, the one or more data stores 715 can include map data 716. The map data 716 can include maps of one or more geographic areas. In some instances, the map data 716 can include information or data on roads, traffic control devices, road markings, structures, features, and/or landmarks in the one or more geographic areas. The map data 716 can be in any suitable form. In some instances, the map data 716 can include aerial views of an area. In some instances, the map data 716 can include ground views of an area, including 360-degree ground views. The map data 716 can include measurements, dimensions, distances, and/or information for one or more items included in the map data 716 and/or relative to other items included in the map data 716. The map data 716 can include a digital map with information about road geometry. The map data 716 can be high quality and/or highly detailed.

In one or more arrangements, the map data 716 can include one or more terrain maps 717. The terrain maps 717 can include information about the ground, terrain, roads, surfaces, and/or other features of one or more geographic areas. The terrain maps 717 can include elevation data in the one or more geographic areas. The map data 716 can be high quality and/or highly detailed. The terrain maps 717 can define one or more ground surfaces, which can include paved roads, unpaved roads, land, and other things that define a ground surface.

In one or more arrangements, the map data 716 can include one or more static obstacle maps 718. The static obstacle map(s) 718 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 718 can have location data, size data, dimension data, material data, and/or other data associated with it. The static obstacle map(s) 718 can include measurements, dimensions, distances, and/or information for one or more static obstacles. The static obstacle map(s) 718 can be high quality and/or highly detailed. The static obstacle map(s) 718 can be updated to reflect changes within a mapped area.

The one or more data stores 715 can include sensor data 719. In this context, "sensor data" means any information about the sensors that the vehicle 700 is equipped with, including the capabilities and other information about such sensors. As will be explained below, the vehicle 700 can include the sensor system 720. The sensor data 719 can relate to one or more sensors of the sensor system 720. As an example, in one or more arrangements, the sensor data 719 can include information on one or more LIDAR sensors 724 of the sensor system 720.

In some instances, at least a portion of the map data 716 and/or the sensor data 719 can be located in one or more data stores 715 located onboard the vehicle 700. Alternatively, or in addition, at least a portion of the map data 716 and/or the sensor data 719 can be located in one or more data stores 715 that are located remotely from the vehicle 700.

As noted above, the vehicle 700 can include the sensor system 720. The sensor system 720 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 720 includes a plurality of sensors, the sensors can work independently from each other. Alternatively, two or more of the sensors can work in combination with each other. In such case, the two or more sensors can form a sensor network. The sensor system 720 and/or the one or more sensors can be operatively connected to the processor(s) 710, the data store(s) 715, and/or another element of the vehicle 700 (including any of the elements shown in FIG. 7). The sensor system 720 can acquire data of at least a portion of the external environment of the vehicle 700.

The sensor system 720 can include any suitable type of sensor. Various examples of different types of sensors will be described herein. However, it will be understood that the embodiments are not limited to the particular sensors described. The sensor system 720 can include one or more vehicle sensors 721. The vehicle sensors 721 can detect, determine, and/or sense information about the vehicle 700 itself. In one or more arrangements, the vehicle sensors 721 can be configured to detect, and/or sense position and orientation changes of the vehicle 700, such as, for example, based on inertial acceleration. In one or more arrangements, the vehicle sensors 721 can include one or more accelerometers, one or more gyroscopes, an inertial measurement unit (IMU), a dead-reckoning system, a global navigation satellite system (GNSS), a global positioning system (GPS), a navigation system 747, and/or other suitable sensors. The vehicle sensors 721 can be configured to detect, and/or sense one or more characteristics of the vehicle 700. In one or more arrangements, the vehicle sensors 721 can include a speedometer to determine a current speed of the vehicle 700.

Alternatively, or in addition, the sensor system 720 can include one or more environment sensors 722 configured to acquire, and/or sense driving environment data. "Driving environment data" includes data or information about the external environment in which an autonomous vehicle is located or one or more portions thereof. For example, the one or more environment sensors 722 can be configured to detect, quantify and/or sense obstacles in at least a portion of the external environment of the vehicle 700 and/or information/data about such obstacles. Such obstacles may be stationary objects and/or dynamic objects. The one or more environment sensors 722 can be configured to detect, measure, quantify and/or sense other things in the external environment of the vehicle 700, such as, for example, lane markers, signs, traffic lights, traffic signs, lane lines, crosswalks, curbs proximate the vehicle 700, off-road objects, etc.

Various examples of sensors of the sensor system 720 will be described herein. The example sensors may be part of the one or more environment sensors 722 and/or the one or more vehicle sensors 721. However, it will be understood that the embodiments are not limited to the particular sensors described. As an example, in one or more arrangements, the sensor system 720 can include one or more radar sensors 723, one or more LIDAR sensors 724, one or more sonar sensors 725, and/or one or more cameras 726. In one or more arrangements, the one or more cameras 726 can be high dynamic range (HDR) cameras or infrared (IR) cameras.

The vehicle 700 can include an input system 730. An "input system" includes any device, component, system, element or arrangement or groups thereof that enable information/data to be entered into a machine. The input system 730 can receive an input from a vehicle passenger (e.g., a driver or a passenger). The vehicle 700 can include an output system 735. An "output system" includes any device, component, or arrangement or groups thereof that enable information/data to be presented to a vehicle passenger (e.g., a person, a vehicle passenger, etc.).

The vehicle 700 can include one or more vehicle systems 740. Various examples of the one or more vehicle systems 740 are shown in FIG. 7. However, the vehicle 700 can include more, fewer, or different vehicle systems. It should be appreciated that although particular vehicle systems are separately defined, each or any of the systems or portions thereof may be otherwise combined or segregated via hardware and/or software within the vehicle 700. The vehicle 700 can include a propulsion system 741, a braking system 742, a steering system 743, throttle system 744, a transmission system 745, a signaling system 746, and/or a navigation system 747. Each of these systems can include one or more devices, components, and/or combination thereof, now known or later developed.

The navigation system 747 can include one or more devices, applications, and/or combinations thereof, now known or later developed, configured to determine the geographic location of the vehicle 700 and/or to determine a travel route for the vehicle 700. The navigation system 747 can include one or more mapping applications to determine a travel route for the vehicle 700. The navigation system 747 can include a global positioning system, a local positioning system or a geolocation system.

The processor(s) 710 (and/or processor 110), the training system 100, and/or the autonomous driving module(s) 760 can be operatively connected to communicate with the various vehicle systems 740 and/or individual components thereof. For example, returning to FIG. 7, the processor(s) 710 and/or the autonomous driving module(s) 760 can be in communication to send and/or receive information from the various vehicle systems 740 to control the movement, speed, maneuvering, heading, direction, etc. of the vehicle 700. The processor(s) 110, the training system 100, and/or the autonomous driving module(s) 760 may control some or all of these vehicle systems 640 and, thus, may be partially or fully autonomous.

The processor(s) 110, the training system 100, and/or the autonomous driving module(s) 760 can be operatively connected to communicate with the various vehicle systems 740 and/or individual components thereof. For example, returning to FIG. 7, the processor(s) 710, the training system 100, and/or the autonomous driving module(s) 760 can be in communication to send and/or receive information from the various vehicle systems 740 to control the movement, speed, maneuvering, heading, direction, etc. of the vehicle 700. The processor(s) 110, the training system 100, and/or the autonomous driving module(s) 760 may control some or all of these vehicle systems 640. For example, the processor 710, in one embodiment, controls the camera 726 to acquire images of an area surrounding the vehicle, which are then provided to the training system 100 to extract content about the environment so that the autonomous driving module 760 can make determinations about how to control the vehicle 700.

The processor(s) 710, the training system 100, and/or the autonomous driving module(s) 760 may be operable to control the navigation and/or maneuvering of the vehicle 700 by controlling one or more of the vehicle systems 740 and/or components thereof. For instance, when operating in an autonomous mode, the processor(s) 710, the training system 100, and/or the autonomous driving module(s) 760 can control the direction and/or speed of the vehicle 700. The processor(s) 710, the training system 100, and/or the autonomous driving module(s) 760 can cause the vehicle 700 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 700 can include one or more actuators 750. The actuators 750 can be any element or combination of elements operable to modify, adjust and/or alter one or more of the vehicle systems 740 or components thereof to responsive to receiving signals or other inputs from the processor(s) 710 and/or the autonomous driving module(s) 760. Any suitable actuator can be used. For instance, the one or more actuators 750 can include motors, pneumatic actuators, hydraulic pistons, relays, solenoids, and/or piezoelectric actuators, just to name a few possibilities.

The vehicle 700 can include one or more modules, at least some of which are described herein. The modules can be implemented as computer-readable program code that, when executed by a processor 710, implement one or more of the various processes described herein. One or more of the modules can be a component of the processor(s) 710, or one or more of the modules can be executed on and/or distributed among other processing systems to which the processor(s) 710 is operatively connected. The modules can include instructions (e.g., program logic) executable by one or more processor(s) 710. Alternatively, or in addition, one or more data store 715 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 700 can include one or more autonomous driving modules 760. The autonomous driving module(s) 760 can be configured to receive data from the sensor system 720 and/or any other type of system capable of capturing information relating to the vehicle 700 and/or the external environment of the vehicle 700. In one or more arrangements, the autonomous driving module(s) 760 can use such data to generate one or more driving scene models. The autonomous driving module(s) 760 can determine position and velocity of the vehicle 700. The autonomous driving module(s) 760 can determine the location of obstacles, objects, or other environmental features including traffic signs, trees, shrubs, neighboring vehicles, pedestrians, etc.

The autonomous driving module(s) 760 can be configured to receive, and/or determine location information for obstacles within the external environment of the vehicle 700 for use by the processor(s) 710, and/or one or more of the modules 60 described herein to estimate position and orientation of the vehicle 700, vehicle position in global coordinates based on signals from a plurality of satellites, or any other data and/or signals that could be used to determine the current state of the vehicle 700 or determine the position of the vehicle 700 with respect to its environment for use in either creating a map or determining the position of the vehicle 700 in respect to map data.

The autonomous driving modules 760 either independently or in combination can be configured to determine travel path(s), current autonomous driving maneuvers for the vehicle 700, future autonomous driving maneuvers and/or modifications to current autonomous driving maneuvers based on data acquired by the sensor system 720, driving scene models, and/or data from any other suitable source such as determinations from the sensor data. "Driving maneuver" means one or more actions that affect the movement of a vehicle. Examples of driving maneuvers include: accelerating, decelerating, braking, turning, moving in a lateral direction of the vehicle 700, changing travel lanes, merging into a travel lane, and/or reversing, just to name a few possibilities. The autonomous driving module(s) 760 can be configured to implement determined driving maneuvers. The autonomous driving module(s) 760 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 760 can be configured to execute various vehicle functions and/or to transmit data to, receive data from, interact with, and/or control the vehicle 700 or one or more systems thereof (e.g. one or more of vehicle systems 740).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for generating training data, the system comprising:
   one or more processors; and
   a memory communicably coupled to the one or more processors and storing:
   a mapping module including instructions that when executed by the one or more processors cause the one or more processors to:
   receive a set of images, wherein each image in the set of images depicts an object;
   for each image in the set of images, generate a synthetic image from the image, wherein the synthetic image includes a rendering of the object depicted in the image; and
   based at least in part on the images in the set of images and the synthetic images, generate a mapping function; and
   a training module including instructions that when executed by the one or more processors cause the one or more processors to:
   receive a set of synthetic images; and
   generate training data from the set of synthetic images using the mapping function.

2. The system of claim 1, wherein the training module includes instructions to train a classifier or a regression function using the training data.

3. The system of claim 1, wherein the mapping function is a mapping of one or more synthetic image features to one or more image features.

4. The system of claim 1, wherein the instructions that generate the synthetic image from the image comprise instructions that:
   generate the rendering of the object depicted in the image; and
   overlay the rendering of the object onto a depiction of the object in the image to generate the synthetic image.

5. The system of claim 4, wherein the rendering of the object is generated from a CAD model of the object.

6. The system of claim 1, wherein each image of the set of images comprises a photograph of the object depicted in the image.

7. The system of claim 1, wherein the mapping function is realized by a neural network.

8. A method for generating training data, the method comprising:
   receiving, by a processor, a set of images, wherein each image in the set of images depicts an object;
   for each image in the set of images, generating, by the processor, a synthetic image from the image, wherein the synthetic image includes a rendering of the object depicted in the image;
   based at least in part on the images in the set of images and the synthetic images, generating, by the processor, a mapping function;
   executing a module for receiving, by the processor, a set of synthetic images; and
   generating, by the processor, training data from the set of synthetic images using the mapping function.

9. The method of claim 8, further comprising training, by the processor, a classifier or a regression function using the training data.

10. The method of claim 8, wherein the mapping function is a mapping of one or more synthetic image features to one or more image features.

11. The method of claim 8, wherein the generating the synthetic image from the image comprises:
    generating the rendering of the object depicted in the image; and
    overlaying the rendering of the object onto a depiction of the object in the image to generate the synthetic image.

12. The method of claim 11, wherein the rendering of the object is generated from a CAD model of the object.

13. The method of claim 8, wherein each image of the set of images comprises a photograph of the object depicted in the image.

14. The method of claim 8, wherein each image of the set of images depicts the same object.

15. The method of claim 8, wherein each image of the set of images is associated with a same type of sensor.

16. A non-transitory computer-readable medium for generating training data and including instructions that when executed by one or more processors cause the one or more processors to:
    receive a set of images, wherein each image in the set of images depicts an object;
    for each image in the set of images, generate a synthetic image from the image by:
       generating a rendering of the object depicted in the image; and
       overlaying the rendering of the object onto a depiction of the object in the image to generate the synthetic image;
    based at least in part on the images in the set of images and the synthetic images, generate a mapping function;
    execute a module configured to receive a set of synthetic images;
    generate training data from the set of synthetic images using the mapping function; and
    train a classifier using the generated training data.

17. The non-transitory computer-readable medium of claim 16, wherein the mapping function is a mapping of one or more synthetic image features to one or more image features.

18. The non-transitory computer-readable medium of claim 16, wherein the rendering of the object is generated from a CAD model of the object.

19. The non-transitory computer-readable medium of claim 16, wherein each image of the set of images comprises a photograph of the object depicted in the image captured by a same type of sensor.

20. The non-transitory computer-readable medium of claim 19, wherein the mapping function is associated with the same type of sensor.

* * * * *